No. 689,819. Patented Dec. 24, 1901.
C. L. HORACK.
BICYCLE.
(Application filed May 27, 1896. Renewed Apr. 23, 1901.)
(No Model.) 3 Sheets—Sheet 1.
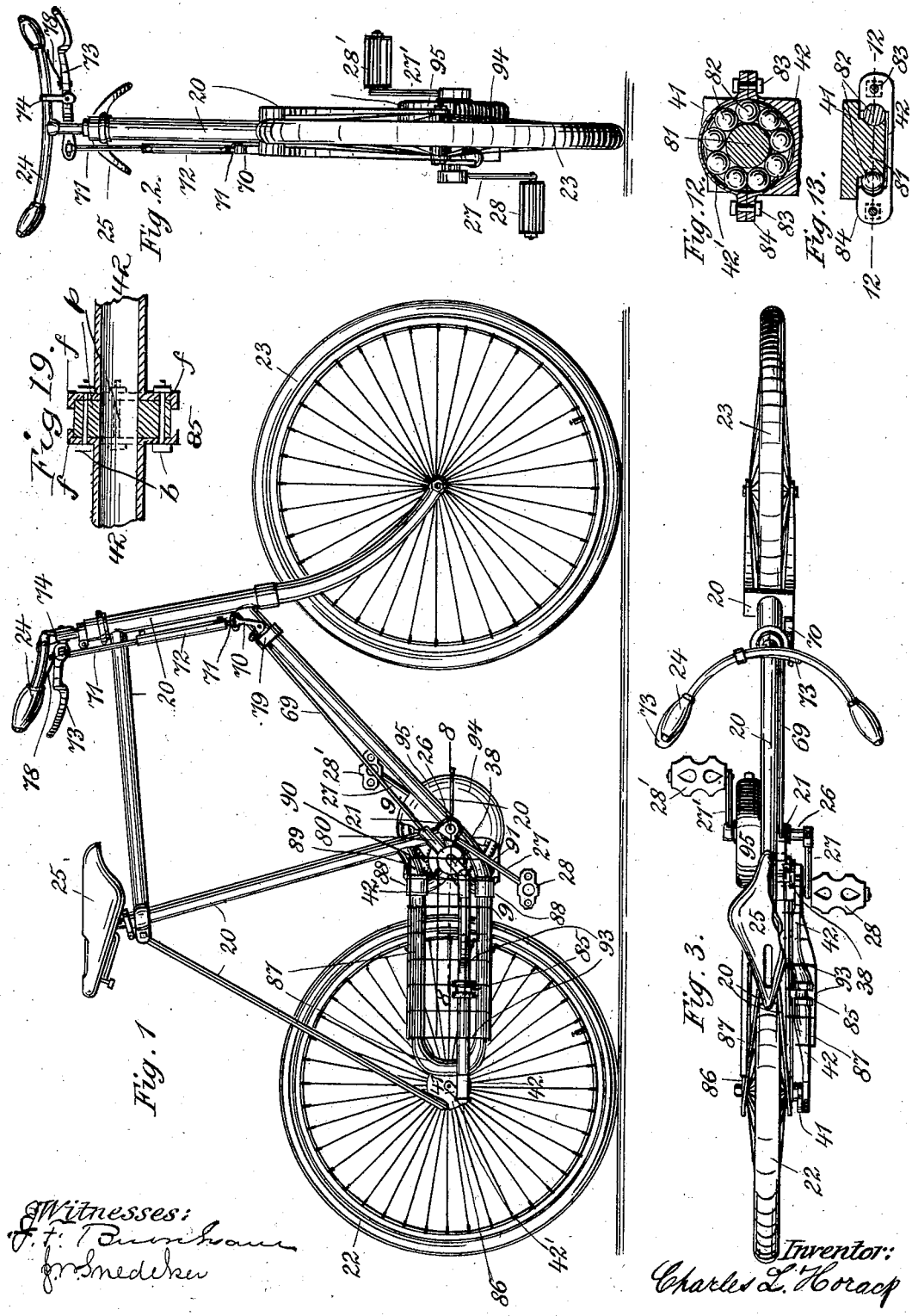
Witnesses:
Inventor:
Charles L. Horack No. 689,819. Patented Dec. 24, 1901.
C. L. HORACK.
BICYCLE.
(Application filed May 27, 1896. Renewed Apr. 22, 1901.)
(No Model.) 3 Sheets—Sheet 2.
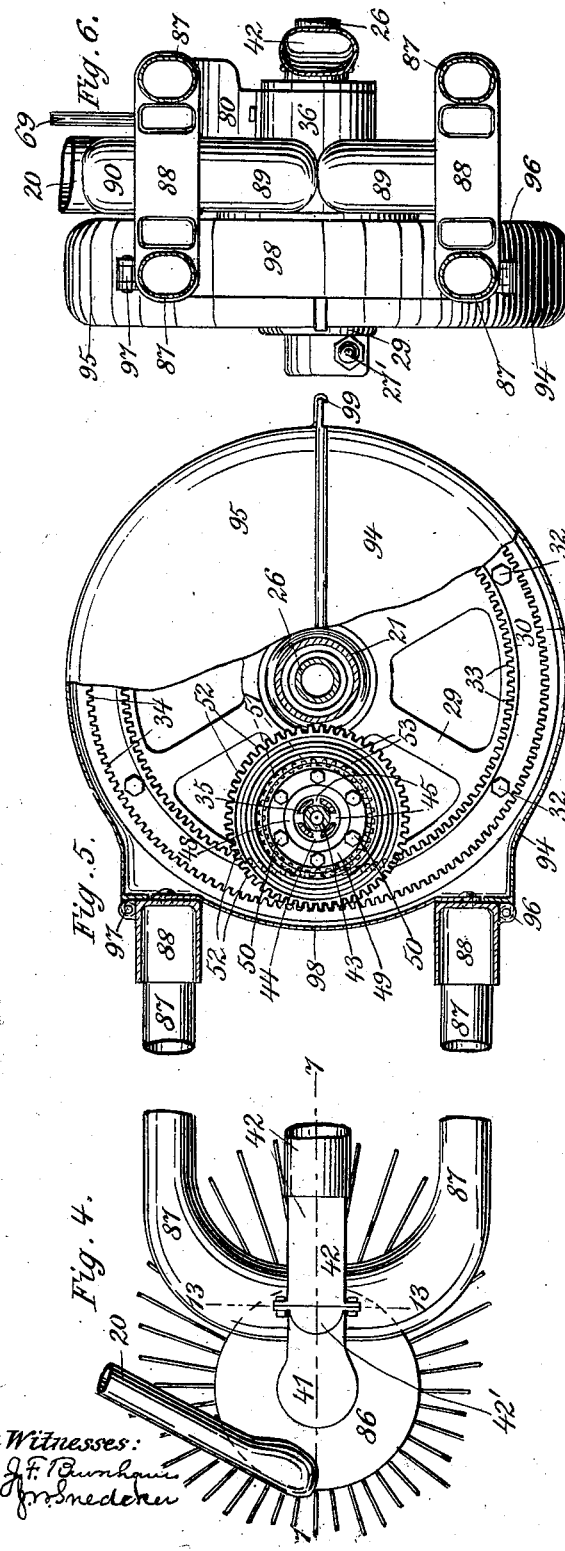
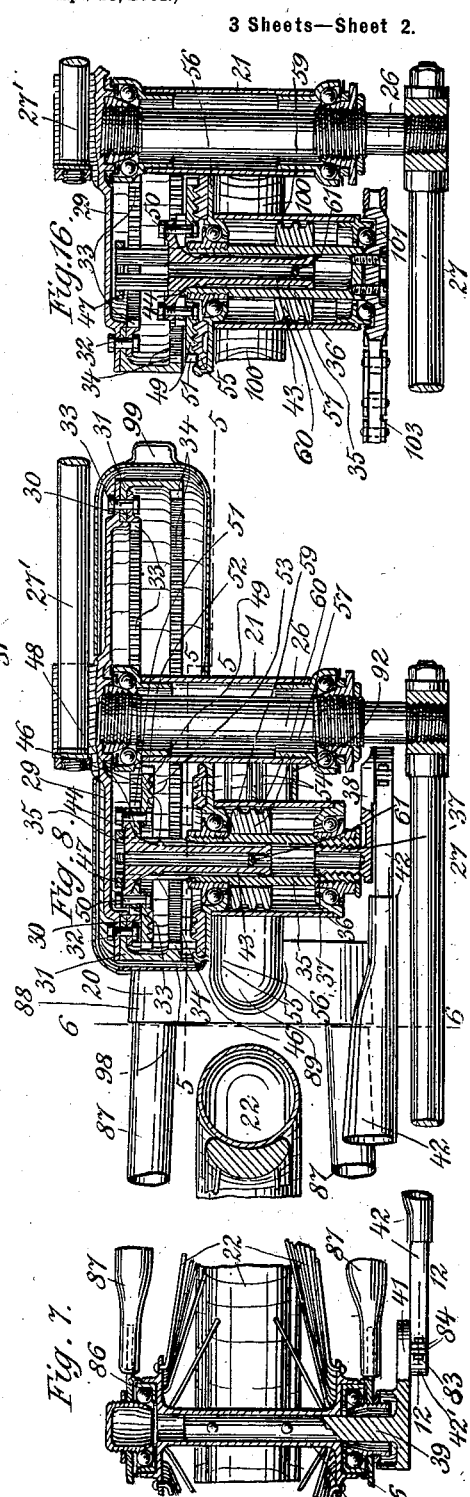
Witnesses:
Inventor:
Charles L. Horack
THE NORRIS PETERS CO., PHOTO-LITHO., WASHINGTON, D. C.

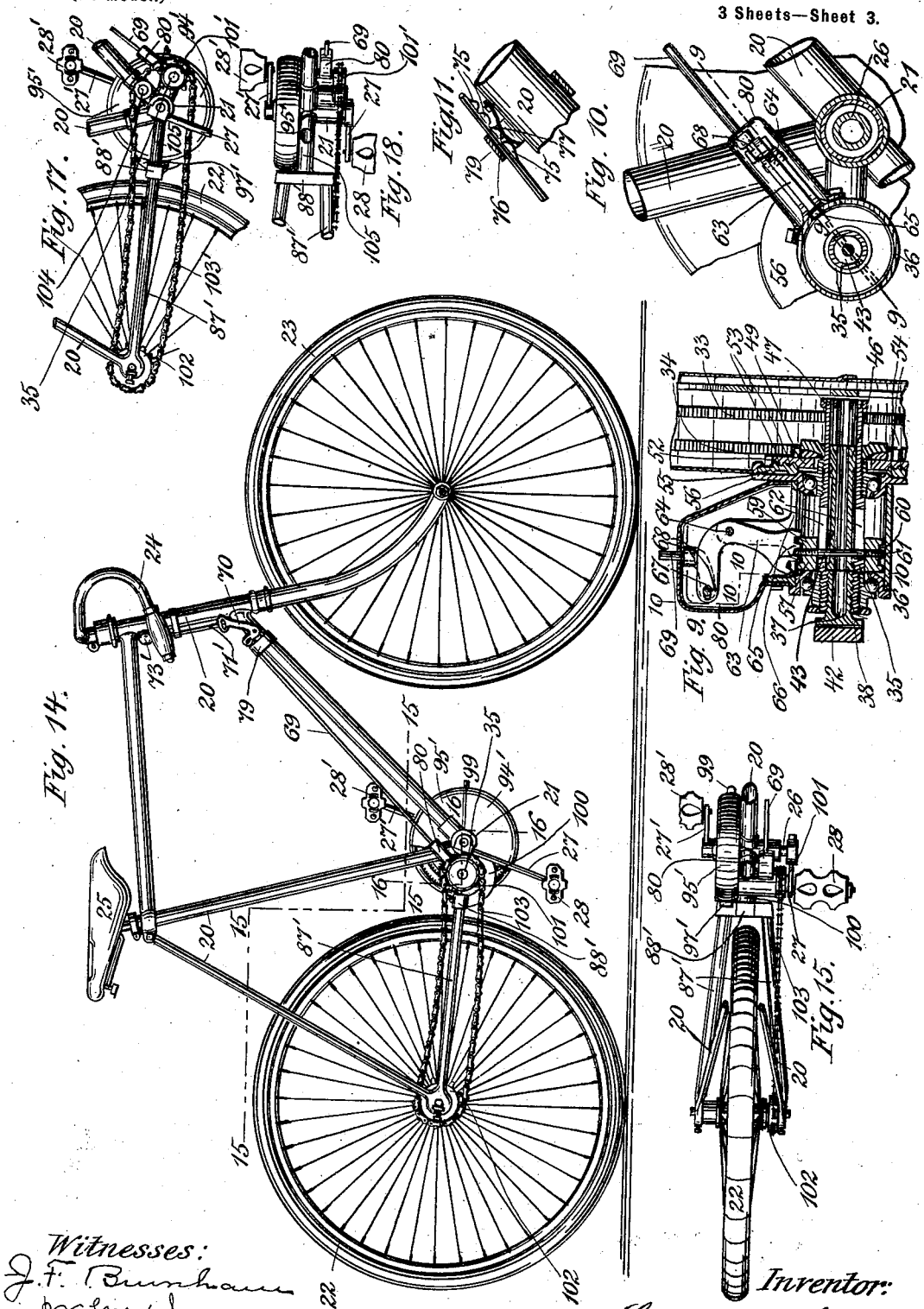

United States Patent Office.

CHARLES L. HORACK, OF BROOKLYN, NEW YORK.

BICYCLE.

SPECIFICATION forming part of Letters Patent No. 689,819, dated December 24, 1901.

Application filed May 27, 1896. Renewed April 23, 1901. Serial No. 57,159. (No model.)

*To all whom it may concern:*

Be it known that I, CHARLES L. HORACK, a citizen of the United States, and a resident of Brooklyn, in the county of Kings and State of New York, have invented certain new and useful Improvements in Bicycles, of which the following is a specification.

My invention relates to vehicles of various kinds, and more particularly to such vehicles, as bicycles and tricycles, which may be propelled by the person seated or mounted thereon or may be propelled by any suitable motor mounted on said vehicle and which may be directed and regulated in their motions by such person.

As all the improvements invented by me are especially applicable to bicycles and as their construction and operation can be best illustrated and explained in connection with bicycles, I will in the following specification and in the drawings accompanying the same make reference particularly to bicycles.

The objects of my invention are to provide suitable mechanical means for transferring motion from the power-wheel to the driving-wheel and also means for varying the speed of the bicycle without changing that of the power-wheel. I accomplish these and other useful purposes by the means and appliances hereinafter described, and set forth more particularly in the claims.

In the accompanying drawings, forming part of this specification, Figure 1 represents a side elevation of a bicycle embodying all the features of my invention, part of the casing protecting the running-gear appearing broken off, while Fig. 2 is a front elevation, and Fig. 3 a ground plan, thereof, part of the saddle only being shown in Fig. 3. Fig. 4 is a side elevation of the portions of the frame and driving mechanism adjoining the hub of the driving-wheel. Figs. 5 and 6 are vertical sections along lines 5 5 and 6 6, respectively, in Fig. 8; Fig. 7, a horizontal section along line 7 7 in Fig. 4, and Fig. 8 a horizontal section along line 8 8 in Fig. 1. In said Fig. 8 the braking mechanism is shown out of action and the driving mechanism set at high speed. Fig. 9 is a section along line 9 9 in Figs. 1 and 10; Fig. 10, a section along line 10 10 in Fig. 9 looking toward the right; and Fig. 11, an elevation, partly in section, of a device for confining the running-gear in its various positions. Fig. 12 is a section along lines 12 12 in Figs. 7 and 13, said Fig. 13 being a section along line 13 13 in Fig. 4. In Figs. 6, 7, and 8 the position of parallel rod 42 corresponds with that shown in Fig. 4. Figs. 14 to 18, inclusive, refer to bicycles embodying leading features of my invention, wherein a sprocket-chain is employed for transmitting motion from the power-wheel to the driving-wheel instead of the crank mechanisms above referred to, Fig. 14 being a side elevation of a bicycle constructed on the same general plan as that illustrated in Fig. 1, part of the casing protecting the running-gear appearing broken away, Fig. 15 being a horizontal section along line 15 15 in Fig. 14. Fig. 16 is a horizontal section along line 16 16 in Fig. 14, the braking mechanism being shown in action. Fig. 17 is a side elevation of the driving mechanism of a bicycle and connecting parts, illustrating particularly how and in what positions my improvements may be applied to the diamond frames of bicycles as now in common use, Fig. 18 being a ground plan of that portion of Fig. 17 containing the power-wheel. Fig. 19 is a vertical longitudinal section through the central portion of connecting-rod 42. Figs. 4, 5, 6, 7, 8, 9, 10, 11, and 16 are drawn to an enlarged scale and Figs. 12, 13, and 19 to a still larger scale.

Similar numerals of reference throughout the different views refer to corresponding parts.

Referring first to Figs. 1 to 13, inclusive, 20 is the frame, which in its general outlines corresponds with the diamond frame now in common use on bicycles, except that that portion between the crank-hanger 21 and the hub of the rear or driving wheel 22 is preferably made divided, as more fully explained hereinafter. 23 is the front or pilot wheel, and 24 the handle-bar, adjusted to be capable of being moved upward and downward in the usual manner. 25 is the saddle, and 26 the pedal-shaft, carrying pedal-bars 27 and 27' and running on ball-bearings within the crank-hanger in usual manner. 28 28' are the pedals. 29 is a disk fixedly secured to pedal-bar 27', so as to revolve with the same and with shaft 26. 30 and 31 are rings of different outer diameter secured concentrically to disk 29 by bolts 32. Ring 30 carries interior teeth 33, and ring 31 carries interior teeth 34, and it will be observed that the teeth on said two rings are placed in different vertical planes in such a manner that the outer ring 31 so surrounds the teeth on ring 30 that the vertical planes in which inner teeth 33 are located intersect ring 31. By this arrangement of teeth 33 with reference to said outer ring it is made possible to alternately employ in my speed-changing device two pinions of different diameters in engagement with two interior gears on the same side of disk 29. 35 is a hollow shaft placed parallel with shaft 26, and 36 the outer shell carrying the ball-bearings for said shaft 35. At the front end of shaft 35 a stud 37, attached to a crank 38, is inserted in and fixedly secured to said shaft. A similar stud 39 is inserted in the front end of the hollow hub 40 of driving-wheel 22 and has attached to it a crank 41. 42 is a connecting-rod so articulated to cranks 38 and 41 that as these cranks revolve they will occupy corresponding positions and said connecting-rod will describe a parallel movement. 43 is a shank adjusted to slide within the rear and central portion of shaft 35. The rear end of said shank has joined to it a disk 44, by means of narrow connections 45, adapted to slide within longitudinal slits 46 in shaft 35, which slits therefore serve to guide said shank longitudinally and to prevent it from revolving with reference to said shaft. 47 is a nut screwed to the rear slitted end of shafts 35, and thereby serving to prevent said shank from sliding to the rear of the position which it occupies, as indicated in Fig. 8. 48 and 49 are annular disks detachably secured to disk 44 by bolts 50. Disk 48 is provided with teeth 51, adapted to mesh with teeth 33 on ring 30, and disk 49 has teeth 52, adapted to mesh with teeth 34 on ring 31. These teeth 51 and 52 again are placed in different vertical planes and are so arranged with reference to each other and to teeth 33 and 34 that when teeth 33 are in mesh with teeth 51 teeth 52 will be located in a plane between teeth 52 and 34 and that even after shank 43 has been moved toward the forward end of shaft 35 sufficiently to entirely disengage teeth 33 and 51 teeth 52 may still clear teeth 34, while a further forward movement of shank 43 will bring teeth 52 into mesh with teeth 34. In detachably connecting disk 30 with disk 31, and also disk 48 with disk 49, and, again, each set of said disks with a main disk, as 29 and 44, respectively, I provide for readily substituting gears offering different speed combinations when desired. 53 indicates corrugations on the front face of disk 49. They substantially correspond with and are adapted to engage with corrugations 54 on an annular disk 55, made of rubber or other suitable material, such rubber disk being secured to a metallic shield 56, which forms part of or is securely attached to the frame of the bicycle. By a still further forward movement of shank 43 the corrugated portion of disk 44 may be utilized as a brake-block by being forced against the corrugations on rubber disk 55.

It will be seen that the teeth above referred to serve to transmit power from the pedal-shaft to shaft 35, and through the same to the driving-wheel, and that the relative positions which it is possible to give to said teeth and to the rings and disks carrying said teeth permit of four different conditions to be produced in the driving mechanism of the bicycle, as follows: When teeth 33 and 51 are in mesh, the bicycle runs at high speed. When teeth 51 are out of engagement with teeth 33 and prior to the meshing of teeth 52 with teeth 34, no power is transmitted from the pedal-shaft to shaft 35. Bringing next teeth 52 into mesh with teeth 34 produces low speed, while the further forward movement of shank 43 will disengage teeth 52 and 34, but will bring brake-blocks 49 and 55 into operative contact, thus producing braking action. Backward movement of shank 43 will of course produce corresponding results, but in reverse order. By thus compelling the throwing into mesh of the low-speed gearing before the rider can change from the use of the high-speed gearing to the use of the braking mechanism I moderate the shock which would otherwise be imparted to the bicycle and the rider.

For the purpose of alternately locking the parts of the running mechanism in the various positions above referred to I employ the following means:

57 is a sleeve adapted to slide along the outer surface of shaft 35 and within the outer shell or cylinder 36, containing the ball-bearings for said shaft. Said sleeve along its outer surface is provided with ridges 59 and grooves 60 between said ridges. A pin 61 so passes through said sleeve and shank 43 as to compel said parts to always move together, substantially consolidating the same into one structure. 62 indicates longitudinal slits in shaft 35, in which said pin is permitted to travel, and wherein the same is guided.

63 is an angle-lever fulcrumed at 64 and provided at its lower extremity with teeth 65, which engage with grooves 60 on sleeve 57 through a suitable slit 66 in cylinder 36. The upper arm of said angle-lever occupies an approximately level position. Near its outer extremity it is provided with an elongated eye 67, with which engages the shoe 68 of a rod 69. This rod connects by means of an angle-lever 70, provided with elongated eyes and fulcrumed to the bicycle-frame, with a sectional rod 71, which is made adjustable in length by having the upper end of its lower section and the lower end of its upper section adjustably secured by proper set-screws within a tube 72.

73 is a lever fulcrumed to a hanger 74, secured to handle-bar 24, such lever serving to actuate the mechanism for shifting shank 43, as follows: As the rider draws the free end of lever 73 toward the handle-bar he forces rod 71 downward and draws rod 69 upward. This elevates the upper arm of elbow-lever 63, thereby swinging its lower arm forward toward the position where the brake-blocks come into operative contact, while downward movement of the free end of said lever will move shank 46 in the opposite direction.

For the purpose of locking the shifting device in any one of the three positions which it may assume after the braking-contact has been interrupted I provide rod 69 with a series of ridges 75, forming notches between them, with which a projection 76, attached to a leaf-spring 77 on the bicycle-frame, so engages that in the position illustrated in Fig. 11 the parts of the running-gear are locked in such relative positions as to produce low speed, while if projection 76 were in engagement with the central notch this would correspond with the condition of coasting, and if in engagement with the notch at the extreme right the device would be locked at high speed. While an additional notch might be provided for locking the device in its braking position, I prefer to omit such notch, so as to give the operator more freedom of action. Leaf-spring 78, inserted between handle-bar 24 and lever 73, will force the braking-surfaces out of operative contact as soon as the rider releases his hold on the handle portion of said lever. The action of leaf-spring 77, with its projection 76, is such that as spring 78 forces lever 73 downward said spring 77 will prevent the gear-wheels from passing into the positions corresponding either with coasting or with high speed, as it will, before either of these positions could be reached, owing to the impetus given to rod 69 by spring 78, enforce operative contact between projection 76 and the upper right-hand notch, Fig. 11, and thereby between teeth 34 and 52, and thus secure normal movement of the gearing and the bicycle, while when projection 76 rests within one of the notches a vigorous movement imparted to said handle portion of the lever will cause projection 76 to release its hold on the notch with which it may be in engagement and will enable the operator to cause it to engage with either of the other notches or else will enable him to apply the brake.

79 is a loop made of sheet metal secured to frame 20 and inclosing and protecting the part of leaf-spring 77 carrying projection 76.

80 is a removable housing for protecting angle-lever 63 and connecting parts.

Connecting-rod 42 I prefer to provide with ball-bearings where the same is articulated to cranks 38 and 41. Such a construction is illustrated in Figs. 12 and 13. Crank 41 is provided on its outer face with a stud 81, the periphery of which has a groove adapted to receive the bearing-balls 82. The end of connecting-rod 42 where it passes over said stud is formed in the shape of a sectional cap fitting the bearing-balls 82, the extreme end portion 42' of said connecting-rod being detachably connected with the main portion of said rod by bolts 83, passing through suitable flanges 84, and it will be seen that balls 82 thus run along an inner groove on stud 81 and along a sectional outer groove within connecting-rod 42 42', the dividing-surfaces cutting through said grooves, and that as soon as bolts 83 have been properly tightened said balls will prevent the separation at said connecting-rod from stud 81. I prefer to make the central main portion of connecting-rod 42 in two parts. 85 is a coupling uniting said parts. The same consists of flanges $ff$ at the ends of said parts and facing each other, an elastic or yielding packing $p$, interposed between the same, and bolts $bb$, passing through said flanges and packing for the purpose of permitting of adjusting the length of said connecting-rod and at the same time easing the movement of the running-gear, owing to the yielding action of said packing. While the connection between the crank-hanger and the rear inclined fork of the frame may be made in any suitable manner, I prefer to employ disks 86, one on each side of the axle of the rear wheel, to which the members of said fork may be connected. 87 represents U-shaped members on both sides of said bicycle attached to said disks in the rear and to shoes 88 forward. 89 represents braces between said shoes and shell 36, 90 and 91 braces between said shoes and the saddle-post and the crank-hanger, respectively, and 92 a brace between said crank-hanger and shell 36. By this construction thorough rigidity of the frame in the vicinity of the driving mechanism is secured, and, besides, the approximately horizontal bars forming part of U-shaped members 87 being placed above and below connecting-rod 42 serve to protect the same and may also be utilized as supports for a dress-guard 93, extending over and outside of said connecting-rod. It will be observed that the forward end of connecting-rod 42, together with crank 38, are placed and operate in the rear of pedal-bar 27 and are thus protected by the same against contact with the foot of the rider.

It is important to keep the running-gear free from dust and protect it in general, making it, however, readily accessible for the purpose of inspecting it and oiling it. For such purpose I inclose the same in a sectional casing, preferably constructed as follows:

94 and 95 are portions of a drum inclosing the running-gear, 94 being a lower section hinged at 96 to lower shoe 87, and 95 an upper section or lid hinged at 97 to upper shoe 88, the two sections resting on shield 56 and crank-hanger 21 and overlapping each other where they mesh and being provided with a joint spring-catch 99, whereby they will be compelled to maintain their relative positions until released by the operator.

98 is a third section of the casing in engagement with shield 56 and aforesaid sections and overlapping said sections when the casing is closed. Section 98 is secured to shoes 88 by screws. It will be seen that upon releasing spring-latch 99 sections 94 and 95 can readily be swung rearward, so as to fully expose and make accessible all parts of the running-gear.

Figs. 14, 15, and 16 illustrate a bicycle and its running-gear constructed substantially like the one illustrated in the preceding figures with the exception that a chain with suitable sprocket-wheels is employed instead of parallel rod 42 and its connecting-cranks and that the frame of the bicycle and some of the minor details of the bicycle are modified in accordance with said conditions, the relative positions of shafts 26 and 35, however, remaining the same. This construction will be employed particularly where it is proposed to run by chain and where a frame is to be constructed with special reference to the use of my improvements, while in Figs. 17 and 18 my improvements are shown to be applied to a bicycle originally provided with the ordinary diamond frame, such frame being altered only to a slight extent afterward for the purpose of applying thereto my improvements.

In Figs. 14, 15, and 16 the shell 36, inclosing axle 35, may be secured to a central bracket 100, extending rearward from crank-hanger 21, and also to said crank-hanger direct. The rear end of said bracket supports a shoe 88', from which two forking members 87' extend to and connect with the rear upright fork of the bicycle-frame. The principal difference between this construction and that illustrated in the preceding figures is that a sprocket-wheel 101 is substituted on shaft 35 for the crank 38, that instead of employing a crank 41 in connection with the driving-wheel a small sprocket-wheel 102 is fixedly attached to the axle of said wheel in the usual manner, and that a chain 103 communicates motion from wheel 101 to wheel 102. The casing inclosing the running-gear is shown here to consist of two halves 94' and 95', hinged to shoe 88' and joined together by a spring-catch 99. A handle 73' for actuating the speed-changing appliances and the brake in this case communicates with bell-crank lever 70 by a continuous rod 71' and is independent of handle-bar 24.

In the arrangement of running-gear illustrated in Figs. 17 and 18 the shaft 35, with its surrounding shell, is shown to be placed to the right of and to be connected with and supported from pedal-hanger 21, and an idler 104 is secured to the frame above said shaft and said pedal-hanger for guiding chain 103' so as not to interfere with or come in contact with other parts of the structure. 105 is a straight single brace extending between the crank-hanger and shoe 88'. The two sections 94' and 95' are again hinged to shoe 88' and joined together, as before described.

I do not propose to confine myself to the details illustrated and herein described, as various modifications may be made in such details and in the general arrangement of the structure described without departing from the spirit of my invention.

I claim as new and desire to secure by Letters Patent—

1. In a bicycle, the combination with its frame, of the pedal-shaft, the pedals, the geared pedal-wheel, an independent shaft, a pinion on said shaft and in interior engagement with the pedal-wheel, a power-transmitting device between the shaft of the pinion and the axle of the driving-wheel, and means for sliding said pinion along its axle.

2. In a bicycle, the combination of a pedal-shaft, an interior gearing mounted thereon, an independent hollow shaft carrying a device for transmitting power to the driving-wheel, a shaft guided along and adapted to slide within said hollow shaft, and a pinion mounted on said sliding shaft and adapted to mesh with the gearing on the pedal-shaft.

3. In a bicycle, the combination with the pedal-shaft, the shaft of the driving-wheel and an independent shaft, of an interior gear-wheel mounted on one of said shafts, a pinion meshing therewith mounted on another of said shafts, one of the shafts carrying said meshing gear-wheels being constructed of two members one of which is adapted to slide along the other, the two members being adjusted to revolve together, and means for transmitting power between the two shafts carrying such meshing gear-wheels and the third shaft.

4. In a bicycle, the combination with the pedal-shaft, the shaft of the driving-wheel and an independent shaft, of two interior gear-wheels of different diameters mounted on one of said shafts, two pinions of different diameters and adapted to alternately mesh with aforesaid gear-wheels mounted on another of said shafts, one of the shafts carrying said meshing gear-wheels being constructed of two members, one of which is adapted to slide along the other, the two members being adjusted to revolve together, mechanism for actuating said sliding member, and means for transmitting power between the two shafts carrying such meshing gear-wheels and the third shaft.

5. In a bicycle, the combination with the pedal-shaft, the shaft of the driving-wheel and an independent shaft, of meshing gear-wheels mounted on two of said shafts and means for transmitting power between said gear-wheels and the third shaft, one of the shafts carrying the meshing gear-wheels being constructed of two members, one of which is tubular, the other being mounted inside and outside of it and adapted to slide along said tubular member.

6. In a bicycle, the combination of a pedal-shaft, a gearing mounted thereon, an independent shaft, a power-transmitting device between the same and the driving-wheel, a shaft adapted to slide along said independent shaft, a gearing mounted thereon and adapted to mesh with the gearing on the pedal-shaft, a stationary brake-block, and a brake-block mounted on said sliding shaft and adapted to engage with said stationary brake-block.

7. In a bicycle, the combination of a pedal-shaft, a gearing mounted thereon, an independent shaft, a power-transmitting device between the same and the driving-wheel, a shaft adapted to slide along said independent shaft, a gearing mounted thereon and adapted to mesh with the gearing on the pedal-shaft, a block on said sliding shaft provided with a suitable braking-surface placed crosswise to the axis of said shaft, and a second brake-block adapted to engage therewith.

8. In a bicycle, the combination of a pedal-shaft, a gearing mounted thereon, an independent shaft, a power-transmitting device between the same and the driving-wheel, a gearing mounted thereon and adapted to mesh with the gearing on the pedal-shaft, a block on said sliding shaft provided with a corrugated braking-surface placed at right angles to the axis of said shaft and a second brake-block adapted to engage therewith.

9. In a bicycle, the combination with a speed-changing mechanism and a braking mechanism, of an actuating-bar, intermediate devices between said mechanisms and said bar for alternately actuating the speed-changing mechanism and the braking mechanism, a spring for forcing the braking mechanism out of action and an independent spring for enforcing operative engagement between parts of the running-gear and adapted to arrest the movement produced by aforesaid spring.

10. In a bicycle the combination with a speed-changing mechanism, whereby high speed and low speed may be secured alternately, of a braking mechanism, a joint actuating-bar for said mechanism, and intermediate devices connecting said braking and speed-changing mechanisms with each other and with the actuating-bar, all arranged to successively produce high speed, low speed and braking action.

11. In a speed-changing device for bicycles, the combination with the pedal-shaft, the shaft of the driving-wheel and an intermediate shaft, of two pinions of different diameters mounted on one of said shafts and two interior gear-wheels mounted on one of the remaining shafts and adapted to alternately engage with aforesaid pinions, the teeth of the larger interior gear-wheel being placed upon a ring which surrounds the teeth upon the smaller interior gear-wheel.

Signed at New York, in the county of New York and State of New York, this 26th day of May, A. D. 1896.

CHARLES L. HORACK.

Witnesses:
  THEO. PRATT,
  JAMES E. THURSBY.